(12) United States Patent
Han et al.

(10) Patent No.: US 7,891,830 B2
(45) Date of Patent: Feb. 22, 2011

(54) BACK LIGHT UNIT AND LIQUID CRYSTAL DISPLAY USING THE SAME

(75) Inventors: Seung Jun Han, Kyoungsangbuk-do (KR); Seong Hyun Yun, Chungcheongbuk-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 10/670,787

(22) Filed: Sep. 26, 2003

(65) Prior Publication Data

US 2004/0130881 A1    Jul. 8, 2004

(30) Foreign Application Priority Data

Sep. 27, 2002    (KR) .................. 10-2002-0058725

(51) Int. Cl.
*G09F 13/08* (2006.01)
*G09F 13/10* (2006.01)

(52) U.S. Cl. .............. 362/97.2; 362/260; 362/614; 349/70

(58) Field of Classification Search ............. 362/29–30, 362/97, 260, 224–225; 349/70; 313/493
See application file for complete search history.

(56) References Cited

U.S. PATENT DOCUMENTS

| | | | | |
|---|---|---|---|---|
| 5,975,722 | A * | 11/1999 | Van Duijneveldt | 362/296 |
| 6,099,134 | A * | 8/2000 | Taniguchi et al. | 362/618 |
| 6,949,890 | B2 * | 9/2005 | Chou et al. | 315/294 |
| 6,992,736 | B2 * | 1/2006 | Saito et al. | 349/58 |
| 2002/0030993 | A1 * | 3/2002 | Itoh | 362/246 |

FOREIGN PATENT DOCUMENTS

| | | |
|---|---|---|
| JP | 10-082914 | 3/1998 |
| JP | 10-106319 | 4/1998 |
| JP | 2000162593 A * | 6/2000 |

* cited by examiner

*Primary Examiner*—Jason Moon Han
(74) *Attorney, Agent, or Firm*—McKenna, Long & Aldridge LLP (57) ABSTRACT

There is explained a back light unit and a liquid crystal display using the same for improving brightness characteristic and difference of the color sense of a liquid crystal display having a direct-below-type back light. The back light unit and the liquid crystal display using the same according to an embodiment of the present invention includes a back light unit having a lamp housing, a plurality of lamps respectively having a first electrode and a second electrode and arranged in the lamp housing so that the first electrode and the second electrode are alternately disposed in one side of the lamp housing, a diffusion plate disposed on the lamp housing, and an optical sheet disposed on the diffusion plate; and a liquid crystal panel disposed on the back light unit having a plurality of liquid crystal cells arranged in a matrix form to thereby increase the brightness and minimize right/left difference of the color sense and improve picture quality.

4 Claims, 9 Drawing Sheets

| No | COLOR DEGREE x, y | | COLOR DEGREE UV | | MAX | | MIN | | ΔUV |
|---|---|---|---|---|---|---|---|---|---|
| | x | y | u | v | u | v | u | v | |
| 1 | 0.2730 | 0.2514 | 0.19961 | 0.27572 | 0.19976 | 0.27931 | 0.19681 | 0.27012 | 0.0097 |
| 2 | 0.2680 | 0.2440 | 0.19880 | 0.27153 | | | | | |
| 3 | 0.2727 | 0.2511 | 0.19948 | 0.27552 | | | | | |
| 4 | 0.2751 | 0.2556 | 0.19948 | 0.27798 | | | | | |
| 5 | 0.2680 | 0.2442 | 0.19874 | 0.27163 | | | | | |
| 6 | 0.2752 | 0.2556 | 0.19954 | 0.27799 | | | | | |
| 7 | 0.2680 | 0.2438 | 0.19892 | 0.27139 | | | | | |
| 8 | 0.2728 | 0.2512 | 0.19951 | 0.27562 | | | | | |
| 9 | 0.2755 | 0.2557 | 0.19976 | 0.27805 | | | | | |
| 10 | 0.2644 | 0.2420 | 0.19681 | 0.27012 | | | | | |
| 11 | 0.2724 | 0.2507 | 0.19942 | 0.27532 | | | | | |
| 12 | 0.2755 | 0.2565 | 0.19941 | 0.27845 | | | | | |
| 13 | 0.2650 | 0.2420 | 0.19727 | 0.27018 | | | | | |
| 14 | 0.2765 | 0.2581 | 0.19953 | 0.27931 | | | | | |
| 15 | 0.2646 | 0.2421 | 0.19691 | 0.27021 | | | | | |
| 16 | 0.2728 | 0.2508 | 0.19968 | 0.27542 | | | | | |
| 17 | 0.2766 | 0.2576 | 0.19974 | 0.27911 | | | | | |

FIG.7B

| No | COLOR DEGREE x, y | | COLOR DEGREE UV | | MAX | | MIN | | ΔUV |
|---|---|---|---|---|---|---|---|---|---|
| | x | y | u | v | u | v | u | v | |
| 1 | 0.2939 | 0.2775 | 0.20476 | 0.28995 | 0.20494 | 0.28995 | 0.20423 | 0.28719 | 0.0028 |
| 2 | 0.2922 | 0.2749 | 0.20452 | 0.28862 | | | | | |
| 3 | 0.2940 | 0.2773 | 0.20485 | 0.28988 | | | | | |
| 4 | 0.2930 | 0.2761 | 0.20464 | 0.28924 | | | | | |
| 5 | 0.2923 | 0.2750 | 0.20453 | 0.28870 | | | | | |
| 6 | 0.2932 | 0.2765 | 0.20466 | 0.28944 | | | | | |
| 7 | 0.2924 | 0.2750 | 0.20461 | 0.28870 | | | | | |
| 8 | 0.2940 | 0.2772 | 0.20494 | 0.28982 | | | | | |
| 9 | 0.2932 | 0.2762 | 0.20468 | 0.28928 | | | | | |
| 10 | 0.2905 | 0.2721 | 0.20441 | 0.28719 | | | | | |
| 11 | 0.2936 | 0.2767 | 0.20481 | 0.28958 | | | | | |
| 12 | 0.2918 | 0.2749 | 0.20423 | 0.28859 | | | | | |
| 13 | 0.2918 | 0.2741 | 0.20452 | 0.28825 | | | | | |
| 14 | 0.2923 | 0.2756 | 0.20428 | 0.28898 | | | | | |
| 15 | 0.2918 | 0.2742 | 0.20453 | 0.28831 | | | | | |
| 16 | 0.2938 | 0.2768 | 0.20492 | 0.28963 | | | | | |
| 17 | 0.2923 | 0.2753 | 0.20446 | 0.28881 | | | | | |

BACK LIGHT UNIT AND LIQUID CRYSTAL DISPLAY USING THE SAME

This application claims the benefit of Korean Patent Application No. 2002-58725, filed on Sep. 27, 2002, which is hereby incorporated by reference for all purposes as if fully set forth herein.

BACKGROUND OF THE INVENTION

1. Field of the Invention

The present invention relates to a back light unit for improving a brightness and a difference of the color sense of a liquid crystal display having a direct-below-type back light and a liquid crystal display using the same.

2. Discussion of the Related Art

In general, a liquid crystal display (hereinafter referred to as "LCD") has a characteristic of lightness, thinness, and low-power-consumption driving and thus its application scope has been widened. The LCD is used in an office automation machine and an audio/video machine in accordance with such a trend. The LCD adjusts transmitting quantity of light beam in accordance with image signal applied to a plurality of control switches arranged in a matrix form to thereby display desired pictures in a screen.

Since the LCD is not a spontaneous display apparatus, it needs a light source such as a back light. The back light for LCD has a two types such as a direct-below-type method and a light guide plate method. The direct-below-type back light has several phosphor lamps in a plane. Further direct-below-type back light has a diffusion plate installed between phosphor lamp disposed and liquid crystal panel to thereby constantly maintain a gap between liquid crystal panel and diffusion plate. The light guide plate back light has a phosphor lamp installed in an outside of the plate so that light is incident to whole surface of a liquid crystal panel by using a transparent light guide plate from the phosphor lamp.

Figure 1:
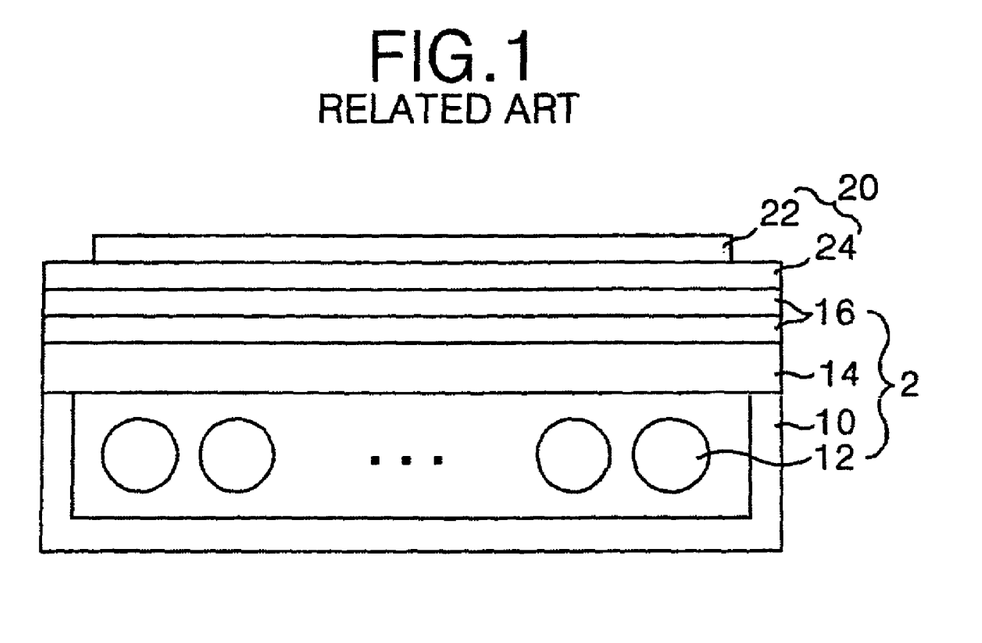
FIG. 1 is a sectional view schematically illustrating a liquid crystal display using a direct-below-type back light unit of a related art.

Referring to FIG. 1, the LCD using the direct-below-type back light of a related art includes a liquid crystal panel 20 for displaying pictures and a back light unit 2 for uniformly radiating light to the liquid crystal panel 20.

The liquid crystal cells are arranged in active matrix form between upper and lower substrates 22 and 24 of the liquid crystal panel 20. Pixel electrodes and common electrodes are installed to apply electric field for each liquid crystal cell. In general, while the pixel electrode is formed for each liquid crystal cell on the lower substrate 24, that is, on the thin film transistor substrate, the common electrode is integrally formed in one body on whole surface of the upper substrate 22. Each of the pixel electrodes is connected to a thin film transistor used as a switch device. The pixel electrode drives the liquid crystal cell along with the common electrode in accordance with data signal supplied through thin film transistor to thereby display pictures corresponding to video signal.

Back light unit 2 includes a plurality of lamps 12 generating light, a lamp housing located in the lower part of the plurality of lamps 12 (or a lamp container 10 of the direct-below-type back light unit 2), a diffusion plate 14 located in the upper part of the plurality of lamps 12, and optical sheets 16 located on the diffusion plate 14.

Each of the lamps 12 includes a glass tube, an inert gas in the glass tube, and a cathode and an anode installed at opposing ends of the glass tube. The inert gas is filled up in the glass tube, and a phosphor is applied at the inner wall of the glass tube.

In the lamps 12, if AC voltage from the inverter (not shown) is applied to a high-pressure electrode (or a first envelope part H) and a low-pressure electrode (or a second envelope part L), electrons are emitted from the low-pressure electrode L and are collided with the inert gas in the glass tube whereby the quantity of electrons is increased exponentially. The current flows in the glass tube by the increase electrons, the inert gas is excited by the electrons and thus ultraviolet rays are emitted. The ultraviolet rays are collided with the phosphor applied at the inner wall of the glass tube to thereby emit visible rays.

Figure 2:
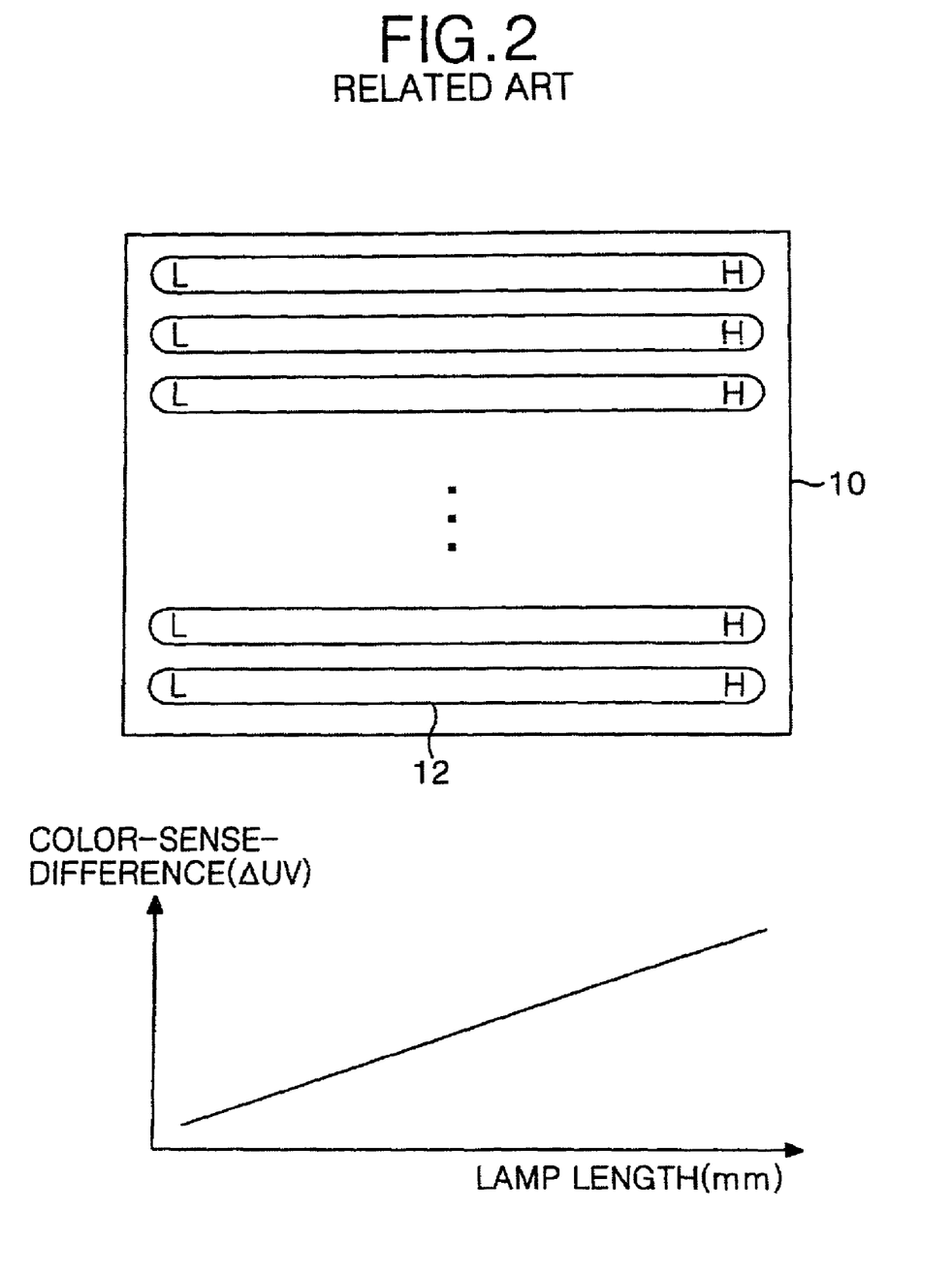
FIG. 2 is a plane view illustrating arrangement of lamps shown in FIG. 1.

The lamps 12 are arranged in parallel on the lamp housing 10. As shown in FIG. 2, the lamps 12 are arranged on the lamp housing 10 identically with the arrangement of the high-pressure electrode H and the low-pressure electrode L.

The lamp housing 10 prevents light-leakage of the visible rays emitted from each of the lamps 12 and reflects the visible rays proceeding to both a side surface and a rear surface of the lamps 12 toward the diffusion plate 14 to thereby improve light efficiency of the lamps 12.

The diffusion plate 14 makes the light emitted from the lamps proceed toward the liquid crystal panel 20 and make the light incident at an wide scope of angle. The diffusion plate 14 includes a transparent resin film having a light diffusion material coated on both sides thereof.

The optical sheets 16 lessen a visual angle of the light emitted from the diffusion plate 16 to thereby improve a brightness of a liquid crystal display and to decrease a power consumption.

Since in the LCD adopting the direct-below-type back light of the related art, the high-pressure electrode H and the low-pressure electrode L of the plurality of lamps 12 are identically arranged, the difference of a right/left color sense arises. That is, during manufacturing process of the lamps 12 used in the direct-below-type back light, the difference of the color coordinate (the difference of the color sense) is generated in a length direction in accordance with the length of the lamp.

Figure 3:
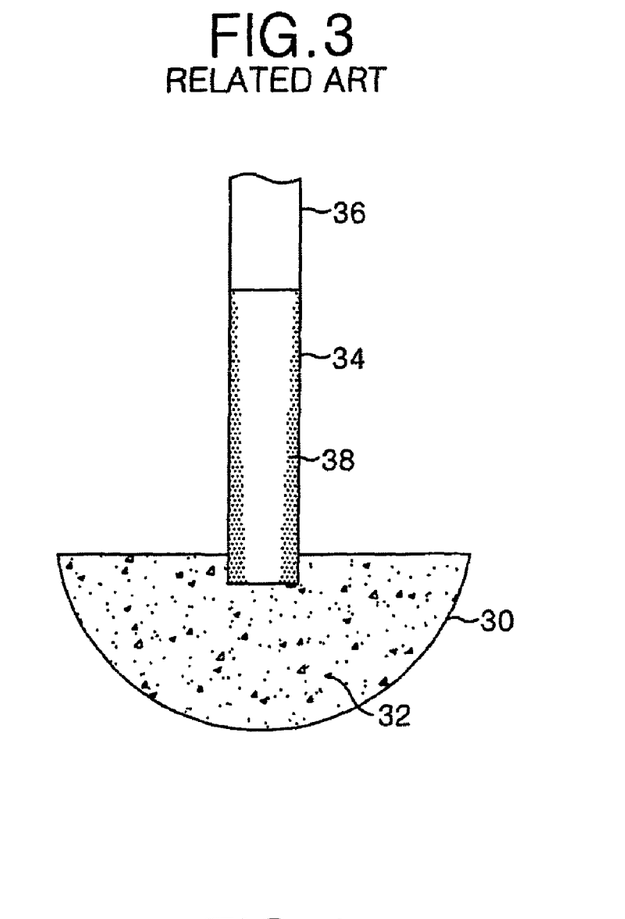
FIG. 3 is a sectional view illustrating a method spreading phosphor within lamps shown in FIG. 1.

Explaining this in full detail, as shown in FIG. 3, the manufacturing process of the lamps 12 used in a direct-below-type back light comprises preparing an organic solvent 32 mixed with the phosphors of each of red R, green G, and blue B contained in a vessel 30. And then, a lamp tube 34 is connected to a vacuum pad 36, and the organic solvent is imbibed in the vessel 30 through the lamp tube 34 by a vacuum pressure and the organic solvent 32 is applied to the lamp tube 34 by vacuum. Thereby, the organic solvent 32 is coated on inside wall. If the phosphor is coated on the inside wall of the lamp bulb 34, electrodes are installed in both side of opposing open parts and the open parts of both side are sealed to thereby complete a lamp.

Since the phosphor 38 is coated on the inside wall 34 of the lamp bulb by vacuum pressure, in accordance with the vacuum pressure and the length of the lamp bulb, the thickness of the lower part is thicker than that of the upper part. Accordingly, in accordance with the thickness of the phosphor 38 coated on the inside wall of the lamp bulb 34, the difference of the color sense between the high pressure electrode H and the lower pressure electrode L arises. Though the brightness of the back light having the phosphor of $BaMgAl_{10}O_{17}:EU2+$ (BAM) has a brightness characteristic more than 10% of back light having the phosphor of $SCA(Sr, Ba, Ca)_{10}(PO_4)Cl_2:Eu$, since the lamp is manufactured by the manufacturing process as described above, the difference of the right/left color sense according to the length of the lamp is generated excessively. On the other hand, the SCA of the phosphor has a defect that high price of optical sheet or brightness improvement of the panel is required.

Further, in the LCD employing the direct-below-type back light of the related art, high voltage and high frequency of AC wave is supplied to the lamps 12 and noise due to the high voltage AC wave is mixed with control signals or picture signals for driving the liquid crystal panel. For this reason, there occur the high voltage noise generated from inverter and ripple noise of wave form on the liquid crystal panel by the interference such as horizontal synchronization frequency of the liquid crystal panel. Accordingly, the ripple noise is appeared on pictures displayed on the liquid crystal panel of the LCD to thereby deteriorate the brightness characteristic.

SUMMARY OF THE INVENTION

Accordingly, the present invention is directed to a back light unit and a liquid crystal display device using the same that substantially obviates one or more of the problems due to limitations and disadvantages of the related art.

Accordingly, it is an advantage of the present invention to provide a back light unit and a liquid crystal display using the same capable of improving brightness characteristic and the difference of the color sense of a liquid crystal display having a direct-below-type back light.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In order to achieve these and other advantages of the invention, the back light unit according to an aspect of the present invention includes a lamp housing; and a plurality of lamps respectively having a first electrode and a second electrode and arranged in the lamp housing so that the first and the second electrodes are alternately disposed in one side of the lamp housing.

The back light unit further comprises: a diffusion plate located on the lamp housing; and an optical sheet located on the diffusion plate.

The first electrode and the second electrode are respectively arranged in a zigzag fashion.

The first electrode and the second electrode are alternately arranged by N-number (where N is a positive integer more than 2) in one side of the lamp housing.

A liquid crystal display comprises: a back light unit having a lamp housing, a plurality of lamps respectively having a first electrode and a second electrode and arranged in the lamp housing so that the first electrode and the second electrode are alternately disposed in one side of the lamp housing, a diffusion plate disposed on the lamp housing, and an optical sheet disposed on the diffusion plate; and a liquid crystal panel disposed on the back light unit and having a plurality of liquid crystal cells arranged in a matrix form.

The first electrode and the second electrode are respectively located in a zigzag fashion.

The first electrode and the second electrode are alternately arranged by N-number (where N is a positive integer more than 2) in one side of the lamp housing.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the embodiments of the present invention, examples of which are illustrated in the accompanying drawings.

Hereinafter, the embodiment of the present invention is in detail explained with reference to FIGS. 4 to 9.

Figure 4:
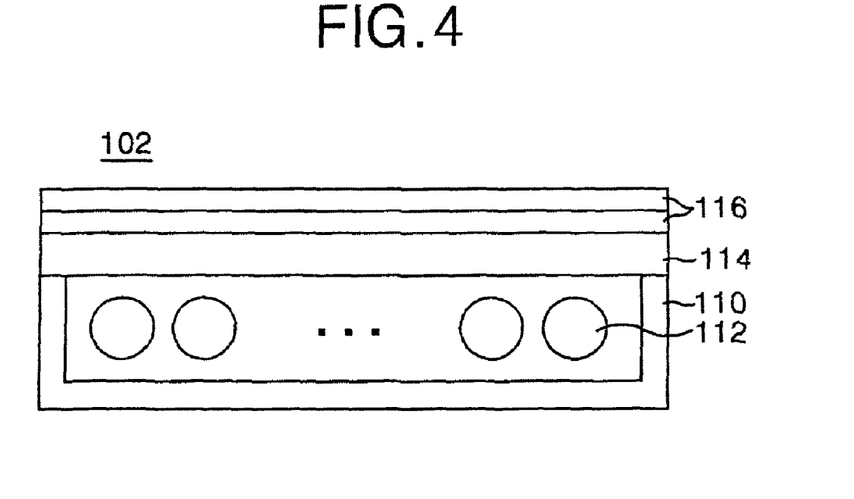
FIG. 4 is a sectional view illustrating back light unit according to an embodiment of the present invention.

Referring to FIG. 4, a back light unit 102 according to the embodiment of the present invention includes a plurality of lamps 112 generating light, a lamp housing 110 (or lamp container of direct-below-type back light unit 102) located at a lower part of the lamps 112, a diffusion plate 114 located at an upper part of the lamps 112, and optical sheets 116 located on the diffusion plate 114.

Each of the lamps 112 includes a glass tube, an inert gas in the glass tube, a cathode and an anode respectively installed at each ending part of the glass tube. The inert gas is filled up inside the glass tube, and a phosphor is applied at the inner wall of the glass tube.

In the lamps 112, if AC voltage from the inverter (not shown) is applied to a high-pressure electrode (or a first envelope part H) and a low-pressure electrode (or a second envelope part L), electrons are emitted from the low-pressure electrode L and are collided with the inert gas in the glass tube whereby the quantity of electrons is increased exponentially. The current flows in the glass tube by the increased electrons and thus the inert gas is exited to emit ultraviolet rays. The ultraviolet rays are collided with a phosphor applied at an inner wall of the glass tube to thereby emit visible rays.

Figure 5:
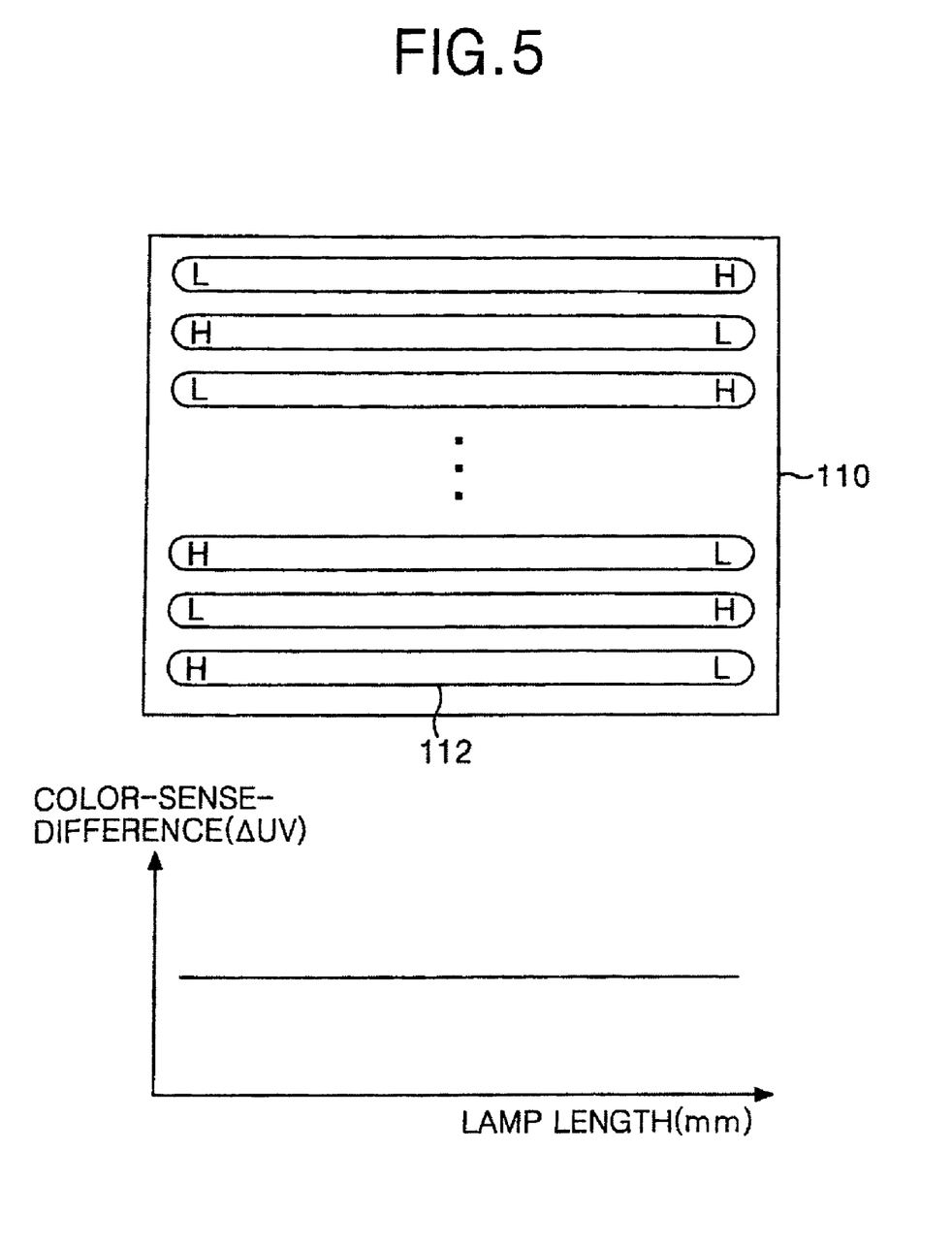
FIG. 5 is a plane view illustrating arrangement of lamps shown in FIG. 4.

The lamps 112 are arranged in parallel on the lamp housing 110. As shown in FIG. 5, the lamps 112 are arranged on the lamp housing 110 so that the arrangement of the high pressure electrode H and low pressure electrode L is repeated. That is, each of odd-numbered (or even-numbered) lamps of the lamps 112, the high voltage electrode H is at its right side and each of even-numbered (or odd-numbered) lamps of the lamps 112 has the low voltage electrode L at its right side. In other words, in the lamps 112, each of the high pressure electrode H and the low pressure electrode L is disposed in a zigzag fashion.

The lamp housing 110 serves to prevent light-leakage of the visible rays emitted from each of the lamps 112 and to reflect the visible rays proceeding to a side surface and a rear surface of the lamps 112 toward diffusion plate 114 to thereby improve light efficiency of the lamps 112.

The diffusion plate 114 functions to proceed the light emitted from the lamps 112 toward the liquid crystal panel (not shown) and to make the light incident at wide scope of angle. The diffusion plate 114 includes a transparent resin film having a light diffusion material coated on both sides thereof.

The optical sheets 116 decrease a visual angle of the light emitted from the diffusion plate 116 to thereby improve a brightness of a liquid crystal display and to decrease a power consumption.

Since the back light unit 102 according to the embodiment of the present invention has the lamps 112 in which the high pressure electrodes H and the low pressure electrodes L are repeated in the lamp housing 110, the difference of the right/left color sense dose not arise. That is, during manufacturing process of the lamps employed in the direct-below-type back light unit 102, the right/left color-coordinate-difference (difference of the color sense) of the lamps arise, by the way, in the present invention, the high pressure electrodes H and the low pressure electrodes L of the lamps 112 are repeatedly disposed to thereby maintain uniform difference of the color sense in the right/left. In other words, for example, if explaining left part of the lamp housing 110 shown in FIG. 5, since the lamps 112 are disposed in sequence of a low pressure electrode L, a high pressure electrode H, a low pressure electrode L, a high pressure electrode H, . . . , the difference of the color sense is offset by adjacent low pressure electrode L and high pressure electrode H to become uniform.

The difference of the right/left difference of the color sense of the back light unit 102 according to the embodiment of the present invention can be expressed by Equation 1 as below.

the difference of right/left difference of the color sense($\Delta uv$)=$((u_1-u_2)^2+(v_1-v_2)^2)^{1/2}$ [Equation 1]

where $u=4x/(3+12y-2x)$ $v=(2/3)\times(9y)/(3+12y-2x)$

In Equation 1, x and y are color coordinates, $u_1$ is max u, $v_1$ is max v, $u_2$ is min u, and $v_2$ is min v. By using Equation 1, the difference of the color sense $\Delta uv$ is calculated by measuring chromaticity coordinates (defined in Commission International De L'Eclairage (CIE)) at an arbitrary point when the lamps 112 are driven. In Equation 1, $u_1$, and $v_1$ have maximum values of color-coordinates measured at the arbitrary point respectively, and $u_2$ and $v_2$ are minimum values of color-coordinates measured at the arbitrary point, respectively. When right/left difference of the color sense $\Delta uv$ is below 0.004 as calculated by Equation 1, the right/left difference of the color sense phenomenon of the lamps 112 does not arise.

Figure 6:
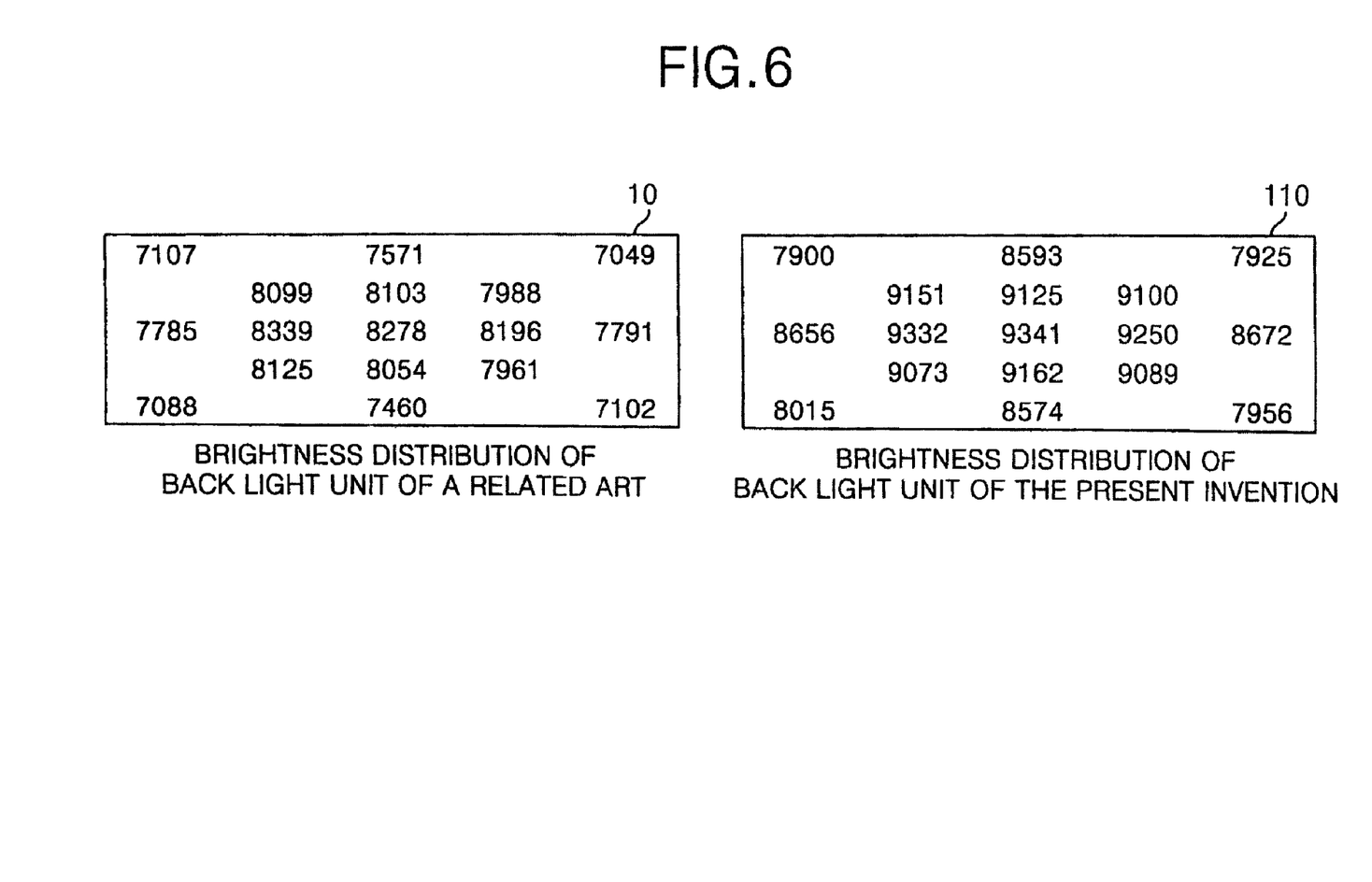
FIG. 6 illustrates brightness distribution of back light unit of the present invention and of a related art.

In conjunction with FIG. 6, the brightness distribution of the back light unit 102 according to the embodiment of the present invention and the brightness distribution of the back light unit according to the related art are compared as follows. As shown in FIG. 6, the brightness distribution of the back light unit 102 having the arrangement of zigzag fashion are more than that of related art in which a plurality of lamps of electrodes have same arrangement structure. That is, at the arbitrary point, since the brightness of the present invention is higher than that of the related art at each arbitrary point, the total brightness of the present invention is improved as compared with the related art.

Figure 7A:
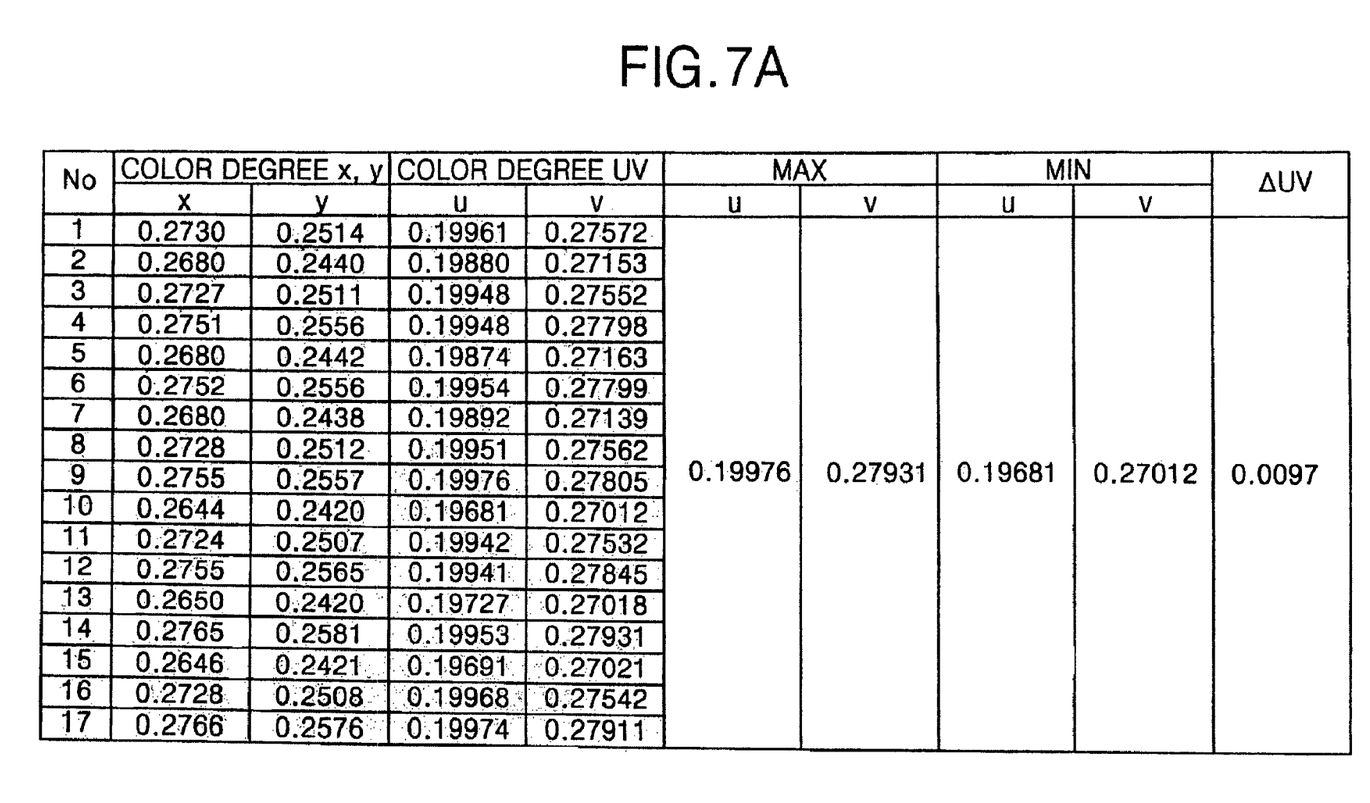
FIG. 7A illustrates difference of the color sense of back light unit of a related art.
Figure 7B:
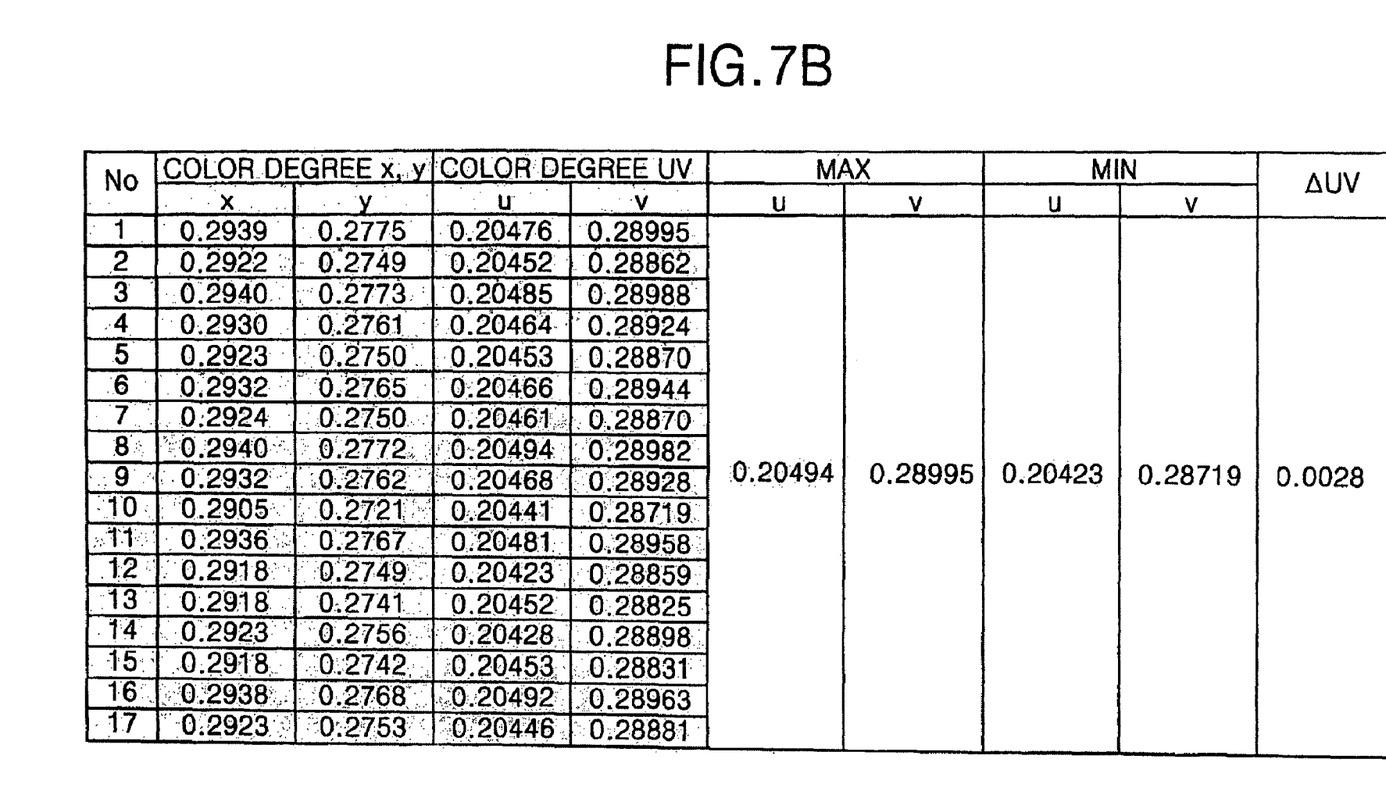
FIG. 7B illustrates difference of the color sense of back light unit of the present invention.

FIGS. 7A and 7B represents tables that the right/left difference of the color sense $\Delta uv$ is calculated by using the color coordinate (x,y) measured value at arbitrary seventeen points shown in FIG. 6. The right/left difference of the color sense $\Delta uv$ of the related art becomes 0.0097 and the right/left difference of the color sense $\Delta uv$ of the present invention becomes 0.0028. Accordingly, while the right/left difference of the color sense arises in the back light unit of the related art, the right/left difference of the color sense phenomenon of the back light unit 102 of the present invention dose not arise since the right/left color-sense-difference $\Delta uv$ is below 0.004.

Accordingly, the electrodes of the lamps 112 are arranged in a zigzag form in the lamp housing and the back light unit 102 of the present invention in which minimizes the right/left difference of the color sense to thereby improve picture quality and to increase brightness of BAM (or SAC) phosphor.

Figure 8:
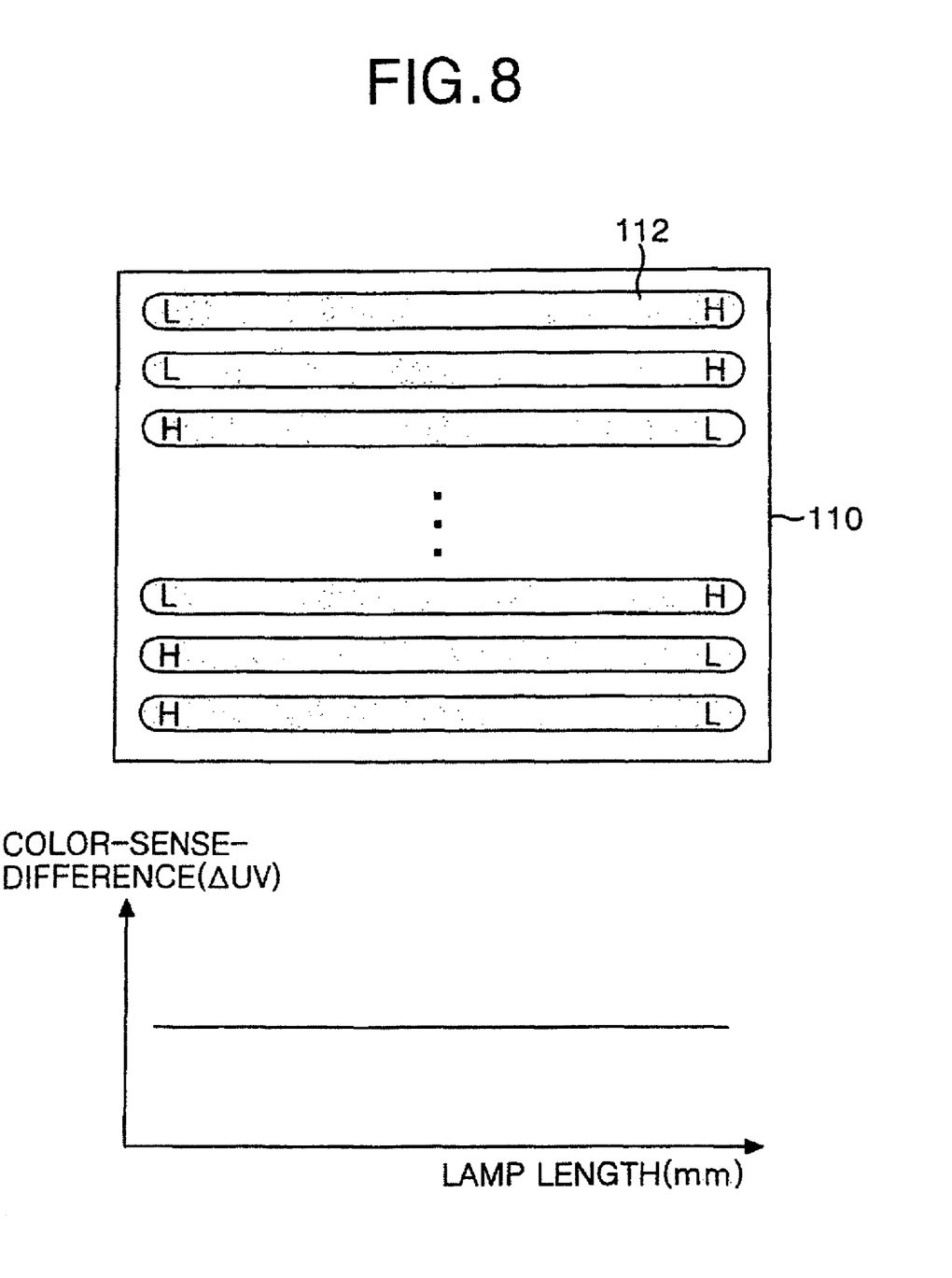
FIG. 8 is a plane view illustrating another arrangement of lamps shown in FIG. 4.

On the other hand, as shown in FIG. 8, the back light unit 102 of the present invention includes a plurality of lamps 112 in which the low pressure electrodes L and the high pressure electrodes H are arranged alternately by n-number (where n is a positive integer more than 2) in one side of the lamp housing 110.

The lamps 112 on the lamp housing 110 have the electrodes repeatedly disposed with the sequence of the high pressure electrode H and the low pressure electrode L, the high pressure electrode H and the low pressure electrode L, the low pressure electrode L and the high pressure electrode H, the low pressure electrode L and the high pressure electrode H and so on. In other words, since the electrodes of the lamp arranged in left side of the lamp housing 110 are arranged with a sequence of the low pressure electrode L, the low pressure electrode L, the high pressure electrode H, the high pressure electrode H, the low pressure electrode L, the low pressure electrode L . . . and so on, the difference of the color sense is offset by the low pressure electrode L and the high pressure electrode H adjacent with each other to evenly maintain right/left difference of the color sense.

Figure 9:
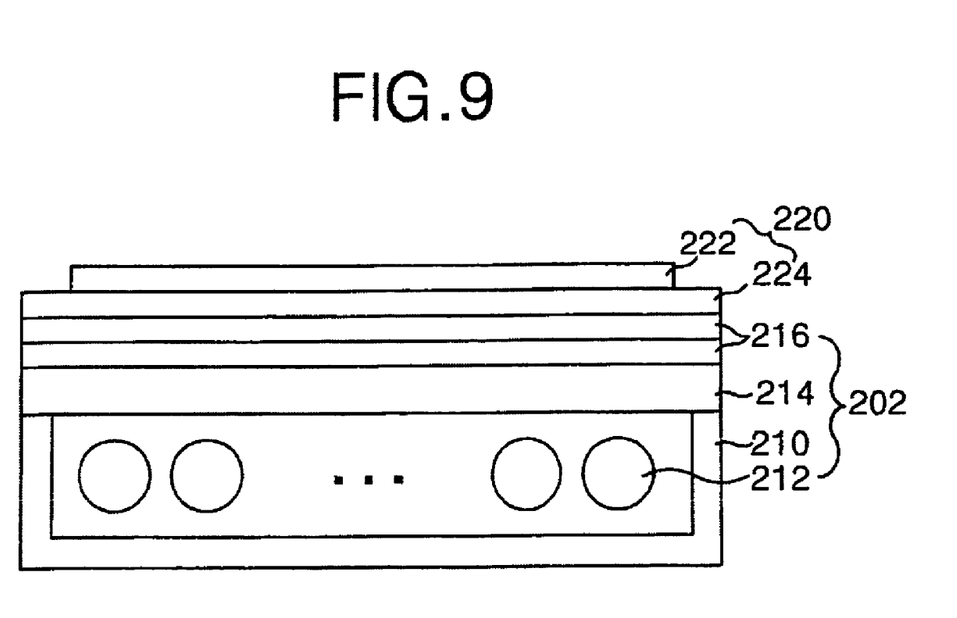
FIG. 9 is a sectional view illustrating liquid crystal display using back light unit according to an embodiment of the present invention.

Referring to FIG. 9, there is shown a liquid crystal display using the back light unit 202 of the present invention which includes a liquid crystal panel for displaying pictures 220 and a back light unit for radiating uniform light to the liquid crystal panel 220.

The liquid crystal cells are arranged in active matrix between upper and lower substrates 222 and 224 of the liquid crystal panel 220. A pixel electrode and a common electrode for applying electric field are installed for each liquid crystal cell. In general, while the pixel electrode is formed for each liquid crystal cell on the lower substrate 224, that is, on a thin film transistor substrate, the common electrode is formed on whole surface of the upper substrate 222. The pixel electrode is connected to the thin film transistor used as a switching device. The pixel electrode drives the liquid crystal cell along with the common electrode in accordance with video data signal supplied through the thin film transistor to thereby display pictures corresponding to the video signal.

A back light unit 202 includes a plurality of lamps 212 generating light, a lamp housing 210 located in the lower part of the lamps 212, a diffusion plate 214 located in the upper part of the lamps 212, and optical sheets 216 located on the diffusion plate 214.

Each of the lamps 212 includes a glass tube, an inert gas in the glass tube, and a cathode and an anode installed at ending parts of the glass tube respectively. The inert gas is filled up in the glass tube, and a phosphor is applied at the inner wall of the glass tube.

If AC voltage from inverter (not shown) is applied to a high-pressure electrode and a low-pressure electrode in each of the lamps 212, electrons are emitted from the low-pressure electrode 1 and are collided with the inert gas in the glass tube to thereby increase the quantity of electrons. The current flows in the glass tube by the increase electrons and thus the inert gas is excited by electrons to emit ultraviolet rays. The ultraviolet rays are collided with phosphor applied to the inner wall of the glass tube to thereby emit visible rays.

The lamps 212 are arranged in parallel on the lamp housing 210. As shown in FIG. 5, the lamps 212 are arranged on the lamp housing 210 so that the arrangement of a high pressure electrode H and a low pressure electrode L is repeated. That is, each of odd-numbered (or even-numbered) lams of the lamps 212 has the high voltage electrode H at its right side, and each of the even-numbered (or odd-numbered) lamps of the lamps 212 has the low voltage electrode L at its right side. In other words, in the lamps 212, each of the high pressure electrode H and the low pressure electrode L is arranged in a zigzag fashion.

The lamp housing 210 serves to prevent light-leakage of the visible rays emitted from each of the lamps 212 and to reflect the visible rays proceeding to a side surface and a rear surface of the lamps 212 toward diffusion plate 214 to thereby improve light efficiency of the lamps 212.

The diffusion plate 214 functions to proceed the light emitted from the lamps 212 toward the liquid crystal panel (not shown) and to make the light incident at wide scope of angle. The diffusion plate 214 includes a transparent resin film having a light diffusion material coated on both sides thereof.

The optical sheets 216 lessen a visual angle of the light emitted from the diffusion plate 214 to thereby improve a brightness of a liquid crystal display and to decrease a power consumption.

Since the back light unit 202 according to the embodiment of the present invention has the lamps 212 in which the high pressure electrodes H and the low pressure electrodes L are repeated on the lamp housing 210, the difference of the right/left color sense dose not arise. That is, during manufacturing process of the lamps employed in the direct-below-type back light unit 202, the difference of the right/left color coordinate (the difference of the color sense) of the lamps arise. However the high pressure electrodes H and the low pressure electrodes L of the lamps 212 of the invention are repeatedly disposed to thereby evenly maintain the difference of the right/left color sense. In other words, for example, if explaining left part of the lamp housing 210 shown in FIG. 5, since the electrodes of the lamps 212 are arranged in a sequence of a low pressure electrode L, a high pressure electrode H, a low pressure electrode L, a high pressure electrode H, and so on, the difference of the color sense is offset by adjacent low pressure electrode L and high pressure electrode H to thereby maintain the difference of the color sense.

On the other hand, the lamps on the lamp housing 210 are disposed so that electrodes of adjacent lamps are arranged with different electrodes for each of at least two lamps. That is, the lamps disposed in parallel on the lamp housing 210 have the electrodes repeatedly arranged with a sequence of the high pressure electrode H and the low pressure electrode L, the high pressure electrode H and the low pressure electrode L, the low pressure electrode L and the high pressure electrode H, the low pressure electrode L and the high pressure electrode H . . . and so on. In other words, since the electrodes of the lamps arranged in left side of the lamp housing 210 are arranged with the sequence of the low pressure electrode L, the low pressure electrode L, the high pressure electrode H, the high pressure electrode H, the low pressure electrode L, the low pressure electrode L, the difference of the color sense is offset by adjacent low pressure electrode L and high pressure electrode H to evenly maintain the difference of the right/left color sense.

Accordingly, the liquid crystal display using the back light unit 202 according to the embodiment of the present invention improves the brightness and minimizes the right/left difference of the color sense to thereby improve the picture quality. Furthermore, the back light unit 202 and the liquid crystal display using the same according to the embodiment of the present invention offsets high voltages generated in adjacent lamps to thereby minimize the level of AC waveform affecting to the liquid crystal panel of the liquid crystal display. Accordingly, the present invention minimizes the ripple noise appeared on the pictures displayed at the liquid crystal panel to thereby increase the brightness.

As described above, the back light unit and the liquid crystal display using the same according to the embodiment of the present invention arranges the lamps to have the arrangement of the high pressure electrode and the low pressure electrode in a zigzag form or the arrangement of the high pressure electrode and the low pressure electrode different with each other for each of at least two lamps. Accordingly, the present invention improves the brightness and minimizes the right/left difference of the color sense to thereby improve the picture quality.

Further, the back light unit and the liquid crystal display using the same according to the embodiment of the present invention offsets the high voltage generated at the lamp to thereby minimize the level of AC waveform affecting to the liquid crystal panel of the liquid crystal display. Accordingly, the present invention can minimize the ripple noise appeared on the picture displayed on the liquid crystal panel.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display, comprising:
a back light unit having a lamp housing having a first side and a second side opposite the first side, a plurality of lamps respectively having a low voltage electrode and a high voltage electrode each at opposite ends of the lamp and arranged substantially parallel in the lamp housing; and
a liquid crystal panel disposed on the back light unit and having a plurality of liquid crystal cells arranged in a matrix form,
wherein the plurality of low voltage electrodes of odd-numbered lamps are disposed at the first side and the plurality of high voltage electrodes of odd-numbered lamps are disposed at the second side,
wherein the plurality of high voltage electrodes of even-numbered lamps are disposed at the first side and the plurality of low voltage electrodes of even-numbered lamps are disposed at the second side,
wherein an inner wall of each lamp is coated with a BAM type phosphor, and a thickness of the BAM type phosphor at the low voltage electrodes is different from that at the high voltage electrodes, wherein an AC voltage from an inverter is applied to the low and high voltage electrodes such that a high voltage noise at the high voltage electrodes is offset by the adjacent low voltage electrodes, and wherein a difference of color sense ($\Delta uv=((u_1-u_2)^2+(v_1-v_2)^2)^{1/2}$) of the back light unit is below 0.004 in which $u=4x/(3+12y-2x)$, $v=(2/3)\times(9y)/(3+12y-2x)$, x and y are color coordinates defined in CIE, $u_1$ is the maximum value of u, $v_1$ is the maximum value of v, $u_2$ is the minimum value of u, and $v_2$ is the minimum value of v.

2. The liquid crystal display according to claim 1, wherein the plurality of low voltage electrodes and the plurality of high voltage electrodes of the lamps are respectively located in a zigzag fashion.

3. The liquid crystal display according to claim 1, wherein the plurality of low voltage electrodes and the plurality of high voltage electrodes of the lamps are alternately arranged by N-number (where N is a positive integer more than 2).

4. A liquid crystal display, comprising:
a back light unit having a lamp housing having a first side and a second side opposite the first side, a plurality of lamps respectively having a low voltage electrode and a high voltage electrode each at opposite ends of the lamp and arranged substantially parallel in the lamp housing; and
a liquid crystal panel disposed on the back light unit and having a plurality of liquid crystal cells arranged in a matrix form, wherein the lamps are arranged in a plurality of groups, each group including N lamps directly next to one another (where N is a positive integer greater than 1), wherein the plurality of low voltage electrodes of odd-numbered groups of lamps are disposed at the first side and the plurality of high voltage electrodes of odd-numbered groups of lamps are disposed at the second side, wherein the plurality of high voltage electrodes of even-numbered groups of lamps are disposed at the first side and the plurality of low voltage electrodes of even-numbered groups of lamps are disposed at the second side, wherein an inner wall of each lamp is coated with a BAM type phosphor, and a thickness of the BAM type phosphor at the low voltage electrodes is different from that at the high voltage electrodes, wherein an AC voltage from an inverter is applied to the low and high voltage electrodes such that a high voltage noise at the high voltage electrodes is offset by the adjacent low voltage electrodes, and wherein a difference of color sense ($\Delta uv=((u_1-u_2)^2+(v_1-v_2)^2)^{1/2}$) of the back light unit is below 0.004 in which $u=4x/(3+12y-2x)$, $v=(2/3)\times(9y)/(3+12y-2x)$, x and y are color coordinates defined in CIE, $u_1$ is the maximum value of u, $v_1$ is the maximum value of v, $u_2$ is the minimum value of u, and $v_2$ is the minimum value of v.

* * * * *